US012651825B2

(12) United States Patent
Wang et al.

(10) Patent No.: US 12,651,825 B2
(45) Date of Patent: Jun. 9, 2026

(54) ELECTRONIC DEVICE

(71) Applicant: Huawei Technologies Co., Ltd., Shenzhen (CN)

(72) Inventors: Jiaming Wang, Shanghai (CN); Dong Yu, Shanghai (CN); Fangchao Zhao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 77 days.

(21) Appl. No.: 18/692,697

(22) PCT Filed: Sep. 15, 2022

(86) PCT No.: PCT/CN2022/118906
§ 371 (c)(1),
(2) Date: Mar. 15, 2024

(87) PCT Pub. No.: WO2023/040928
PCT Pub. Date: Mar. 23, 2023

(65) Prior Publication Data

US 2025/0141089 A1 May 1, 2025

(30) Foreign Application Priority Data

Sep. 18, 2021 (CN) .......................... 202111111392.5

(51) Int. Cl.
*H01Q 1/22* (2006.01)
*H01Q 1/48* (2006.01)
*H01Q 5/30* (2015.01)

(52) U.S. Cl.
CPC ............. *H01Q 1/2266* (2013.01); *H01Q 1/48* (2013.01); *H01Q 5/30* (2015.01)

(58) Field of Classification Search
CPC ............ H01Q 1/22; H01Q 1/52; H01Q 1/243; H01Q 5/30–50
See application file for complete search history.

(56) References Cited

U.S. PATENT DOCUMENTS 10,297,905 B2 * 5/2019 Lu .......................... H01Q 5/392
10,340,592 B2 * 7/2019 Nam ...................... H01Q 1/243
(Continued)

FOREIGN PATENT DOCUMENTS

CN 112531331 A 3/2021
CN 112689033 A 4/2021
(Continued)

*Primary Examiner* — Hasan Islam
(74) *Attorney, Agent, or Firm* — Slater Matsil, LLP

(57) ABSTRACT

An electronic device including an antenna structure is provided. A side frame between a first position and a second position of the electronic device is configured as a first radiator of the antenna structure. A side frame between the second position and a third position of the electronic device is configured as a second radiator of the antenna structure. A first slot is provided at the second position of the side frame. A second slot is formed between the second radiator and a ground. The first radiator extends in a first direction, and is spaced from the third radiator in a second direction. Projections of the third radiator and the first radiator in the second direction at least partially overlap. A first feed point is disposed on the third radiator or the first radiator, and the first feed point is configured to feed the antenna structure.

20 Claims, 11 Drawing Sheets

(56) References Cited

U.S. PATENT DOCUMENTS

| | | | | |
|---|---|---|---|---|
| 11,757,179 | B2 * | 9/2023 | Son | H05K 1/0243 343/872 |
| 12,068,527 | B2 * | 8/2024 | Hsu | H01Q 1/243 |
| 12,166,287 | B2 * | 12/2024 | Wang | H01Q 9/0407 |
| 12,362,459 | B2 * | 7/2025 | Yoon | H01Q 1/243 |
| 2018/0248250 | A1 | 8/2018 | Hsu et al. | |
| 2020/0099126 | A1 | 3/2020 | Ma et al. | |
| 2020/0343623 | A1 * | 10/2020 | Guan | H01Q 5/357 |

FOREIGN PATENT DOCUMENTS

| | | | |
|---|---|---|---|
| CN | 112886232 | A | 6/2021 |
| CN | 113013594 | A | 6/2021 |
| CN | 113140896 | A | 7/2021 |
| CN | 113314845 | A | 8/2021 |

* cited by examiner (a)

(b)

1.8 GHz 2.3 GHz

ELECTRONIC DEVICE

CROSS-REFERENCE TO RELATED APPLICATIONS

This application is a National Stage of International Patent Application No. PCT/CN2022/118906, filed on Sep. 15, 2022, which claims priority to Chinese Patent Application No. 202111111392.5, filed on Sep. 18, 2021. Both of the aforementioned applications are hereby incorporated by reference in their entireties.

TECHNICAL FIELD

This application relates to the field of wireless communication, and in particular, to an electronic device.

BACKGROUND

With development of the information age, a requirement for a data rate becomes increasingly high, and a high-speed requirement for an antenna over the air (over the air, OTA) also becomes increasingly high. When a user holds an electronic device like a mobile phone or a tablet, a human body absorbs some electromagnetic waves. From a perspective of antenna performance, the human body affects radiation efficiency of some antennas. For example, in a beside head with hand (beside head with hand, BHH) state, a smartphone may cause an amplitude reduction of approximately 8 dB to 10 dB for radiation efficiency of a low-frequency antenna (a low frequency may be, for example, a frequency below 1 GHz), and may cause an amplitude reduction of approximately 6 dB to 8 dB for radiation efficiency of a medium-high frequency antenna (a medium-high frequency may be, for example, a frequency above 1 GHz). In addition, based on requirements of laws and regulations, electronic devices with antennas need to meet a requirement of a specific absorption rate (specific absorption rate, SAR) of electromagnetic waves.

Therefore, a current antenna design of a terminal device needs to meet both high-performance OTA and a low SAR.

In an existing solution, a balance between radiation efficiency and an SAR of an antenna may be adjusted through a software design and intelligent user scenario distinguishing, or a proper antenna or antenna combination may be selected through multi-antenna assistance or multi-antenna switching, or the like, and a design of an antenna does not need to be changed. This ensures high radiation efficiency. Therefore, it is clear that how to meet requirements of both radiation efficiency and a low SAR by designing the antenna is an extremely difficult problem at present.

SUMMARY

This application provides an electronic device, including an antenna structure. In the antenna structure, a part of a side frame of the electronic device is configured as a radiator, and a reverse current is constructed by using an introduced metal stub, so that the current is weakly controlled, and impact of a current on a ground of the electronic device on an SAR of the antenna structure is weakened.

According to a first aspect, an electronic device is provided, including: an antenna structure, including a first radiator, a second radiator, and a third radiator; a ground, where the antenna structure is grounded through the ground; and a side frame, where a part of the side frame has a first position, a second position, and a third position in sequence, a side frame between the first position and the second position is configured as the first radiator, and a side frame between the second position and the third position is configured as the second radiator. A first slot is provided at the second position of the side frame. A second slot is formed between the second radiator and the ground. The first radiator extends in a first direction, and is spaced from the third radiator in a second direction. The second direction is perpendicular to the first direction. Projections of the third radiator and the first radiator in the second direction at least partially overlap. A first feed point is disposed on the third radiator or the first radiator, and the first feed point is configured to feed the antenna structure.

According to the technical solution in this embodiment of this application, the third radiator is configured as a feed stub, and provides energy for the second radiator in a coupling manner, to generate radiation by using the second slot. In addition, energy of coupling between the first radiator and the third radiator and energy of coupling between the first radiator and the ground may be controlled, so that two reverse currents are separately generated on the first radiator, and the two reverse currents counteract each other. When the third radiator is configured as the feed stub, a current reverse to a current on the ground may be constructed on the side frame of the electronic device to reduce impact of the current on the ground on the side frame, so that an SAR is reduced.

With reference to the first aspect, in some implementations of the first aspect, the first feed point is disposed on the third radiator, and the first feed point is disposed at an end that is of the third radiator and that is away from the second radiator.

According to the technical solution in this embodiment of this application, the first feed point may alternatively be disposed on the first radiator, and the first radiator is configured as a feed stub for feeding the antenna structure, so that same technical effect can also be achieved. This is not limited in this application.

With reference to the first aspect, in some implementations of the first aspect, the second radiator and the third radiator are spaced in a third direction, and projections of the second radiator and the third radiator in the third direction at least partially overlap.

With reference to the first aspect, in some implementations of the first aspect, the antenna structure further includes a first capacitor, a first end of the first capacitor is electrically connected to the third radiator, and a second end of the first capacitor is electrically connected to the second radiator. With reference to the first aspect, in some implementations of the first aspect, the second end of the first capacitor is electrically connected to an end that is of the second radiator and that is located in the first slot.

With reference to the first aspect, in some implementations of the first aspect, the first end of the first capacitor is electrically connected to an end that is of the third radiator and that is close to the second position.

According to the technical solution in this embodiment of this application, the first capacitor may be connected in series to any position between the third radiator and the second radiator. This is not limited in this application.

With reference to the first aspect, in some implementations of the first aspect, a capacitance value of the first capacitor is less than or equal to 1 pF.

According to the technical solution in this embodiment of this application, by adjusting the capacitance value of the first capacitor, energy transmitted from the third radiator to the second radiator may be controlled, to control a radiation characteristic of the antenna structure.

With reference to the first aspect, in some implementations of the first aspect, the third radiator is a metal sheet.

With reference to the first aspect, in some implementations of the first aspect, a thickness of the metal sheet is less than a minimum thickness of the side frame.

With reference to the first aspect, in some implementations of the first aspect, an electrical length of the third radiator is less than a quarter of a first wavelength, and the first wavelength is a wavelength corresponding to an operating frequency band of the antenna structure.

According to the technical solution in this embodiment of this application, the electrical length of the third radiator may be controlled to be less than a quarter of the first wavelength, so that the second slot is fully excited, to ensure a radiation characteristic of the antenna structure. In addition, different operating modes of the antenna structure may be excited by using an extremely unbalanced operating state of the third radiator, to extend bandwidth of the antenna structure.

With reference to the first aspect, in some implementations of the first aspect, a third slot is provided at the first position of the side frame.

With reference to the first aspect, in some implementations of the first aspect, the first radiator between the first position and the second position is an ungrounded floating metal.

With reference to the first aspect, in some implementations of the first aspect, the first radiator is not provided with a slot at the first position, and the first radiator is electrically connected to the ground at the first position.

With reference to the first aspect, in some implementations of the first aspect, a length of the first radiator is greater than a length of the second radiator.

According to the technical solution in this embodiment of this application, for a structure in which an end of the first radiator is grounded, when a resonant frequency band of the first radiator is higher than a resonant frequency band of the second radiator, a current on the first radiator is large, and an SAR value is high. Therefore, the length of the first radiator may be greater than the length of the second radiator. The length may be understood as an electrical length or a physical length, so that the resonant frequency band generated by the first radiator may be lower than the resonant frequency band generated by the second radiator. In addition, the resonant frequency band generated by the first radiator may be configured to extend a low-frequency communication frequency band of the antenna structure, so that the antenna structure operates in more communication frequency bands, to improve user experience.

With reference to the first aspect, in some implementations of the first aspect, the antenna structure further includes a second capacitor, a first end of the second capacitor is electrically connected to the third radiator, and a second end of the second capacitor is electrically connected to the first radiator.

According to the technical solution in this embodiment of this application, by adjusting a capacitance value of the second capacitor, energy transmitted from the third radiator to the first radiator may be controlled, to control a radiation characteristic of the antenna structure.

With reference to the first aspect, in some implementations of the first aspect, the second end of the second capacitor is electrically connected to an end that is of the first radiator and that is located in the first slot.

With reference to the first aspect, in some implementations of the first aspect, the first end of the second capacitor is electrically connected to an end that is of the third radiator and that is close to the second position.

According to the technical solution in this embodiment of this application, the second capacitor may be connected in series to any position between the third radiator and the first radiator. This is not limited in this application.

With reference to the first aspect, in some implementations of the first aspect, a capacitance value of the second capacitor is less than or equal to 1 pF.

With reference to the first aspect, in some implementations of the first aspect, the end that is of the second radiator and that is located in the first slot is electrically connected to the ground, and the second radiator is electrically connected to the ground at the third position.

According to the technical solution in this embodiment of this application, the second radiator and the ground form a slot antenna to radiate energy to the outside.

With reference to the first aspect, in some implementations of the first aspect, the antenna structure further includes a tuner, one end of the tuner is electrically connected to the end that is of the second radiator and that is located in the first slot, and the other end of the tuner is electrically connected to the ground for switching an operating frequency band of the antenna structure.

According to the technical solution in this embodiment of this application, the tuner may be configured to switch between different electronic elements electrically connected to the second radiator, to switch a resonance point of the antenna structure, so that the antenna structure operates in different frequency bands.

DETAILED DESCRIPTION OF ILLUSTRATIVE EMBODIMENTS

Figure 1:
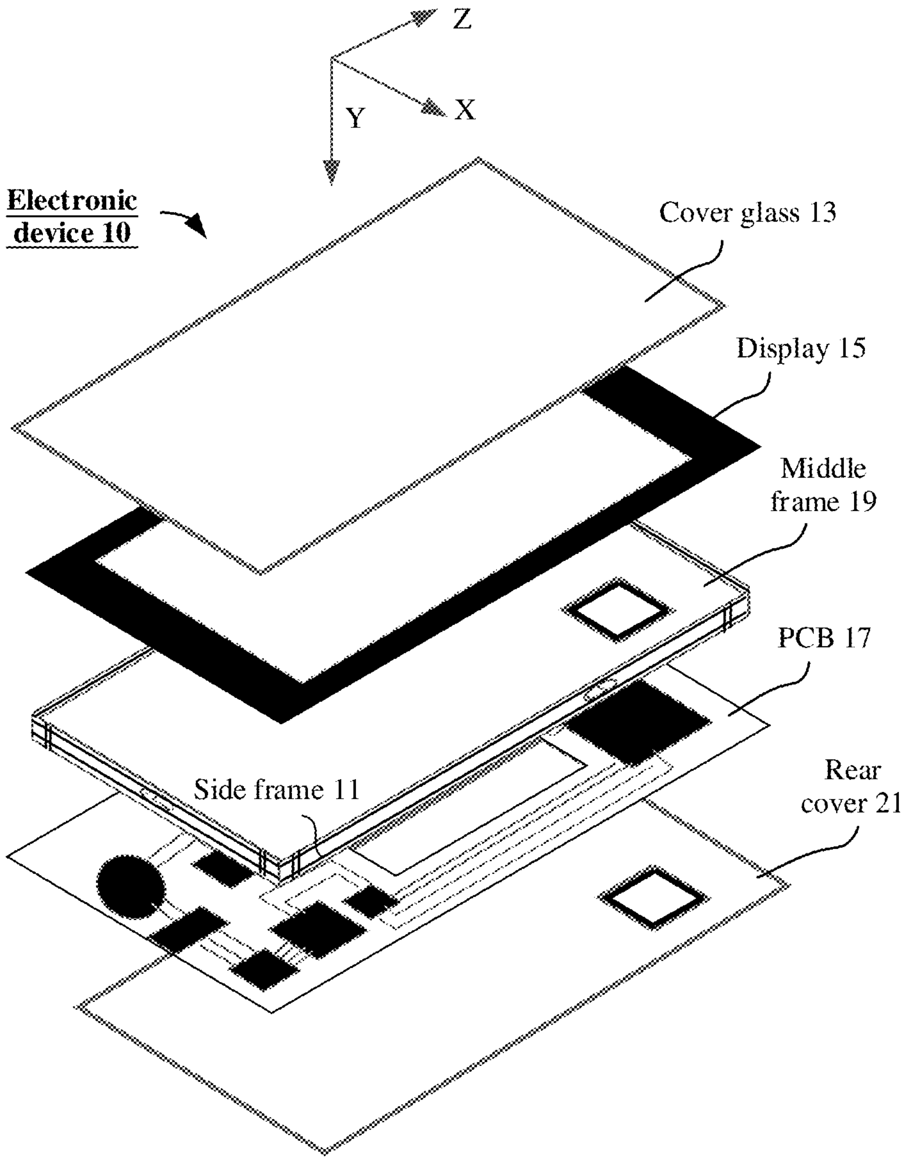
FIG. 1 is a schematic diagram of an electronic device according to an embodiment of this application.

The following describes technical solutions of this application with reference to accompanying drawings.

It should be understood that, in this application, an "electrical connection" may be understood as physical contact and electrical conduction of components, or may be understood as a form in which different components in a line structure are connected through physical lines that can transmit an electrical signal, such as a printed circuit board (printed circuit board, PCB) copper foil or a conducting wire, or may be understood as that components are electrically conducted in a mid-air manner through indirect coupling. "Coupling" may be understood as being electrically conducted in a mid-air manner through indirect coupling. A person skilled in the art may understand that a coupling phenomenon is a phenomenon that two or more circuit elements or electrical networks closely cooperate with and affect each other in input and output, so that energy is transmitted from one side to another side through interaction. Both a "connection" and an "interconnection" may refer to a mechanical connection relationship or a physical connection relationship. For example, an A-B connection or A-B interconnection may mean that a fastening component (for example, a screw, a bolt, a rivet) exists between A and B, or that A and B are in contact with each other and are difficult to be separated.

Antenna pattern: The antenna pattern is also referred to as a radiation pattern. The antenna pattern refers to a pattern in which relative field strength (a normalized modulus value) of an antenna radiation field changes with a direction at a specific distance from the antenna. The antenna pattern is usually represented by two plane patterns that are perpendicular to each other in a maximum radiation direction of an antenna.

The antenna pattern usually includes a plurality of radiation beams. A radiation beam with highest radiation strength is referred to as a main lobe, and another radiation beam is referred to as a minor lobe or side lobe. In minor lobes, a minor lobe in an opposite direction of the main lobe is also referred to as a back lobe.

Antenna return loss: The antenna return loss may be understood as a ratio of power of a signal reflected back to an antenna port through an antenna circuit to transmit power of the antenna port. A smaller reflected signal indicates a larger signal radiated by the antenna to space and higher radiation efficiency of the antenna. A larger reflected signal indicates a smaller signal radiated by the antenna to space and lower radiation efficiency of the antenna.

The antenna return loss may be represented by using an S11 parameter, and S11 is one of S parameters. S11 indicates a reflection coefficient, and this parameter can indicate a level of transmit efficiency of the antenna. The S11 parameter is usually a negative number. A smaller S11 parameter indicates a smaller antenna return loss and less energy reflected by the antenna. In other words, a smaller S11 parameter indicates more energy that actually enters the antenna and higher antenna total efficiency. A larger S11 parameter indicates a larger antenna return loss and lower antenna total efficiency.

It should be noted that, in engineering, an S11 value of −4 dB is generally used as a standard. When an S11 value of the antenna is less than −4 dB, it may be considered that the antenna can operate normally, or it may be considered that the transmit efficiency of the antenna is good.

Smith (Smith) chart: The Smith chart is a calculation chart with equivalent circles for normalized input impedance (or admittance) plotted on a reflection coefficient plane. The chart includes three circles, used to solve a problem with the transmission line and some waveguide problems by using a graphical method, to avoid a complex operation.

Antenna isolation: The antenna isolation is a ratio of a signal transmitted by one antenna and received by another antenna to the signal transmitted by the antenna. The isolation is a physical quantity used to measure a degree of mutual coupling between antennas. If two antennas form a dual-port network, isolation between the two antennas is S21 and S12 for antennas. The antenna isolation may be represented by S21 and S12 parameters. The S21 and S12 parameters are usually negative numbers. Smaller S21 and S12 parameters indicate larger isolation between antennas and a smaller degree of mutual coupling between the antennas. Larger S21 and S12 parameters indicate smaller isolation between the antennas and a larger degree of mutual coupling between the antennas. The antenna isolation depends on a radiation pattern of the antenna, a spatial distance between antennas, an antenna gain, and the like.

Ground (ground): The ground (ground) may generally refer to at least a part of any ground layer, or ground plate, or ground metal layer in an electronic device (like a mobile phone), or at least a part of any combination of any ground layer, or ground plate, or ground component. The "ground" may be used to ground a component in the electronic device. In an embodiment, the "ground" may be a ground layer of a circuit board of the electronic device, or may be a ground metal layer formed by a ground plate formed using a middle frame of the electronic device or a metal thin film below a screen in the electronic device. In an embodiment, the circuit board may be a printed circuit board (printed circuit board, PCB), for example, an 8-layer, 10-layer, or 12-layer to 14-layer board having 8, 10, 12, 13, or 14 layers of conductive materials, or an element that is separated by a dielectric layer or an insulation layer like glass fiber or polymer and that is electrically insulated. In an embodiment, the circuit board includes a dielectric substrate, a ground layer, and a wiring layer. The wiring layer and the ground layer are electrically connected through a via. In an embodiment, components such as a display, a touchscreen, an input button, a transmitter, a processor, a memory, a battery, a charging circuit, and a system on chip (system on chip, SoC) structure may be installed on or connected to the circuit board, or may be electrically connected to the wiring layer and/or the ground layer in the circuit board. For example, a radio frequency source is disposed at the wiring layer.

Any of the foregoing ground layer, or ground plate, or ground metal layer is made of a conductive material. In an embodiment, the conductive material may be any one of the following materials: copper, aluminum, stainless steel, brass and alloys thereof, copper foils on insulation laminates, aluminum foils on insulation laminates, gold foils on insulation laminates, silver-plated copper, silver-plated copper foils on insulation laminates, silver foils on insulation laminates and tin-plated copper, cloth impregnated with graphite powder, graphite-coated laminates, copper-plated laminates, brass-plated laminates, and aluminum-plated laminates. A person skilled in the art may understand that the ground layer/ground plate/ground metal layer may alternatively be made of another conductive material.

The technical solutions provided in embodiments of this application are applicable to an electronic device that uses one or more of the following communication technologies: a Bluetooth (Bluetooth, BT) communication technology, a global positioning system (global positioning system, GPS) communication technology, a wireless fidelity (wireless fidelity, Wi-Fi) communication technology, a global system for mobile communication (global system for mobile communication, GSM) communication technology, a wideband code division multiple access (wideband code division multiple access, WCDMA) communication technology, a long term evolution (long term evolution, LTE) communication technology, a 5G communication technology, and other future communication technologies. The electronic device in embodiments of this application may be a mobile phone, a tablet computer, a notebook computer, a smart household, a smart band, a smart watch, a smart helmet, smart glasses, or the like. The electronic device may be alternatively a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, an electronic device in a 5G network, an electronic device in a future evolved public land mobile network (public land mobile network, PLMN), or the like. This is not limited in embodiments of this application. FIG. 1 shows an example of an electronic device provided in an embodiment of this application. An example in which the electronic device is a mobile phone is used for description.

As shown in FIG. 1, an electronic device 10 may include a cover (cover) 13, a display/module (display) 15, a printed circuit board (printed circuit board, PCB) 17, a middle frame (middle frame) 19, and a rear cover (rear cover) 21. It should be understood that, in some embodiments, the cover 13 may be a cover glass (cover glass), or may be replaced with a cover of another material, for example, a cover of an ultra-thin glass material or a cover of a PET (Polyethylene terephthalate, polyethylene terephthalate) material.

The cover 13 may be tightly attached to the display module 15, and may be mainly used to protect the display module 15 for dust resistance.

In an embodiment, the display module 15 may include a liquid crystal display (liquid crystal display, LCD) panel, a light-emitting diode (light-emitting diode, LED) display panel, an organic light-emitting diode (organic light-emitting diode, OLED) display panel, or the like. This is not limited in this application.

The middle frame 19 is mainly used to support the electronic device. FIG. 1 shows that the PCB 17 is disposed between the middle frame 19 and the rear cover 21. It should be understood that, in an embodiment, the PCB 17 may alternatively be disposed between the middle frame 19 and the display module 15. This is not limited in this application. The printed circuit board PCB 17 may be a flame-resistant material (FR-4) dielectric board, or may be a Rogers (Rogers) dielectric board, or may be a hybrid dielectric board of Rogers and FR-4, or the like. Herein, FR-4 is a grade designation for a flame-resistant material, and the Rogers dielectric board is a high-frequency board. An electronic element, for example, a radio frequency chip, is carried on the PCB 17. In an embodiment, a metal layer may be disposed on the printed circuit board PCB 17. The metal layer may be configured to ground an electronic element carried on the printed circuit board PCB 17, or may be configured to ground another element, for example, a support antenna or a side frame antenna. The metal layer may be referred to as a ground, a ground plate, or a ground layer. In an embodiment, the metal layer may be formed by etching metal on a surface of any dielectric board in the PCB 17. In an embodiment, the metal layer used for grounding may be disposed on a side that is of the printed circuit board PCB 17 and that is close to the middle frame 19. In an embodiment, an edge of the printed circuit board PCB 17 may be considered as an edge of a ground layer of the printed circuit board PCB 17. In an embodiment, the metal middle frame 19 may also be configured to ground the foregoing element. The electronic device 10 may further have another ground/ground plate/ground layer, as described above. Details are not described herein again.

The electronic device 10 may further include a battery (not shown in the figure). The battery may be disposed between the middle frame 19 and the rear cover 21, or may be disposed between the middle frame 19 and the display module 15. This is not limited in this application. In some embodiments, the PCB 17 is divided into a mainboard and a sub-board. The battery may be disposed between the mainboard and the sub-board. The mainboard may be disposed between the middle frame 19 and an upper edge of the battery, and the sub-board may be disposed between the middle frame 19 and a lower edge of the battery.

The electronic device 10 may further include a side frame 11, and the side frame 11 may be made of a conductive material like metal. The side frame 11 may be disposed between the display module 15 and the rear cover 21, and extend around a periphery of the electronic device 10. The side frame 11 may have four sides surrounding the display module 15, to help fasten the display module 15. In an implementation, the side frame 11 made of a metal material may be directly configured as a metal side frame of the electronic device 10 to form an appearance of the metal side frame, and is applicable to a metal industrial design (industrial design, ID). In another implementation, an outer surface of the side frame 11 may alternatively be made of a non-metal material, for example, is a plastic side frame, to form an appearance of the non-metal side frame, and is applicable to a non-metal ID.

The middle frame 19 may include the side frame 11, and the middle frame 19 including the side frame 11 is configured as an integrated component, and may support an electronic element in the electronic device. The cover 13 and the rear cover 21 are respectively covered along an upper edge and a lower edge of the side frame, to form a casing or a housing (housing) of the electronic device. In an embodiment, the cover 13, the rear cover 21, the side frame 11, and/or the middle frame 19 may be collectively referred to as a casing or a housing of the electronic device 10. It should be understood that the "casing or housing" may mean a part or all of any one of the cover 13, the rear cover 21, the side frame 11, or the middle frame 19, or mean a part or all of any combination of the cover 13, the rear cover 21, the side frame 11, or the middle frame 19.

Alternatively, the side frame 11 may not be considered as a part of the middle frame 19. In an embodiment, the side frame 11 and the middle frame 19 may be connected and integrally formed. In another embodiment, the side frame 11 may include a protruding part extending inwards, to be connected to the middle frame 19 by using a spring or a screw, through welding, or the like. The protruding part of the side frame 11 may be further configured to receive a feed signal, so that at least a part of the side frame 11 is configured as a radiator of an antenna to receive/transmit a radio frequency signal. A slot 42 may exist between the middle frame 30 and the part of the side frame that servers as the radiator, to ensure that the radiator of the antenna has a good radiation environment, and that the antenna has a good signal transmission function.

The rear cover 21 may be a rear cover made of a metal material, or may be a rear cover made of a non-conductive material, for example, a glass rear cover, a plastic rear cover, or another non-metallic rear cover.

FIG. 1 shows only an example of some parts included in the electronic device 10. Actual shapes, actual sizes, and actual structures of these parts are not limited to those in FIG. 1.

It should be understood that, in this application, it may be considered that a surface on which the display of the electronic device is located is a front surface, a surface on which the rear cover is located is a rear surface, and a surface on which the side frame is located is a side surface.

It should be understood that, in this application, it is considered that when a user holds the electronic device (the user usually holds the electronic device vertically and faces a screen), a position in which the electronic device is located has a top part, a bottom part, a left part, and a right part.

An SAR is a unit indicating how much radio frequency radiation energy is actually absorbed by a human body, is referred to as a special absorption rate, and is measured in watts/kilogram (W/kg) or milliwatts/kilogram (mW/g). The SAR is accurately defined as a time derivative of unit energy (dw) absorbed by unit mass (dm) in a volume unit (dv) of a given mass density (ρ-body tissue density).

Currently, there are two international standards: the European standard: 2 w/kg, and the American standard: 1.6 w/kg. The European standard specifically means that electromagnetic radiation energy absorbed by each kilogram of human tissue in six minutes is not more than 2 watts.

For a human body, the human body absorbs electromagnetic energy effectively when exposed to a frequency range of 30 MHz to 300 MHz. Therefore, an SAR threshold range is used for a mobile terminal product that is not in the frequency range. The SAR threshold range is written into many market regulations. Once the SAR threshold range is exceeded, legal risks may occur. Therefore, the SAR threshold needs to be complied with by all designers. In this case, many SAR-related control means emerge. For example, an electronic device may use intelligent switching, to reduce an SAR by identifying various states of an antenna and controlling transmit power of the antenna. Alternatively, an SAR may be reduced by constructing a passive structure, or increasing a size of a radiator of an antenna, and increasing a radiation aperture. However, due to an excessively large size, this solution has poor practicality in a case of increasingly pressing internal space of an electronic device.

An embodiment of this application provides an electronic device, for example, a terminal device, including an antenna structure. The antenna structure includes a part of a side frame of the terminal device and a metal stub disposed in a housing. The part of the side frame is configured as a radiator, and the metal stub affects current distribution on the side frame of the terminal device and a ground, to reduce impact of a current of the ground on an SAR of the antenna structure.

Figure 2:
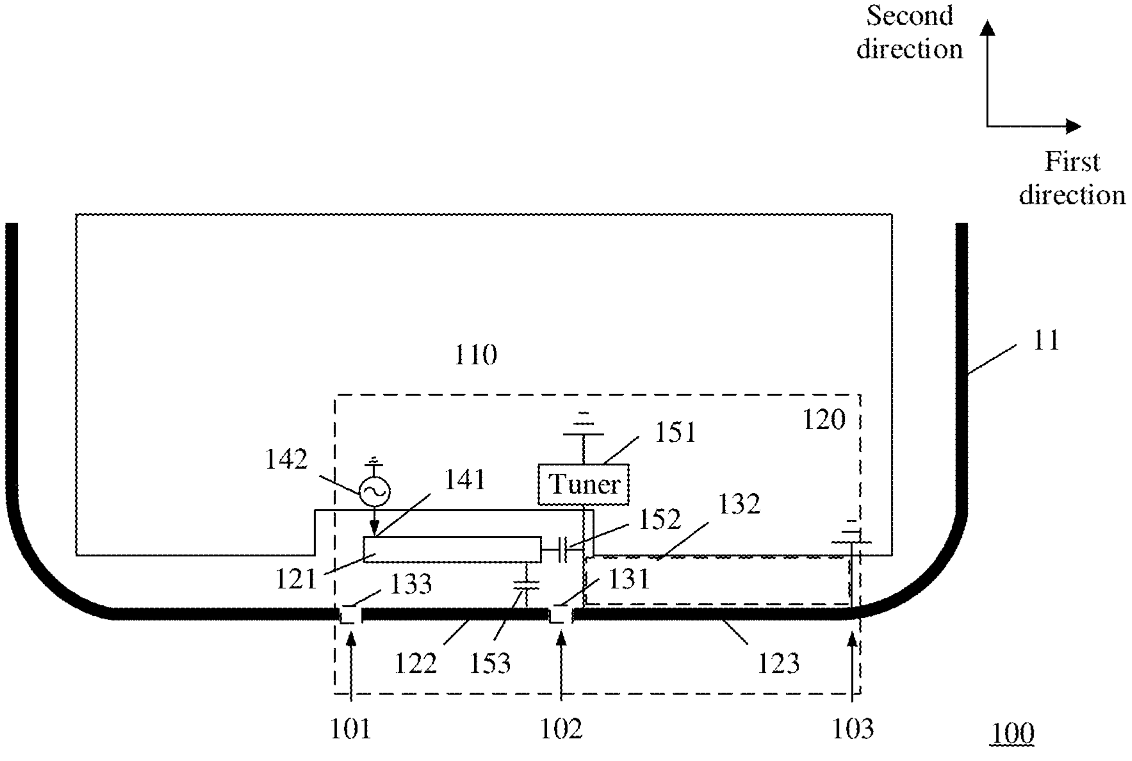
FIG. 2 is a schematic diagram of a structure of an electronic device 100 according to an embodiment of this application.

FIG. 2 is a schematic diagram of a structure of an electronic device 100 according to an embodiment of this application.

As shown in FIG. 2, the electronic device 100 may include the side frame 11, an antenna structure 120, and a ground 110.

A first position 101, a second position 102, and a third position 103 are sequentially disposed on a part of the side frame 11. A side frame 11 between the first position 101 and the second position 102 is configured as a first radiator 122 of the antenna structure 120, and a side frame 11 between the second position 102 and the third position 103 is configured as a second radiator 123 of the antenna structure 120. The antenna structure 120 may include a third radiator 121 disposed in a housing of the electronic device 100. A first slot 131 is provided at the second position 102 of the side frame 11. A second slot 132 is formed between the second radiator 123 and the ground 110. The first radiator 122 extends in a first direction, and is spaced from the third radiator 121 in a second direction. The second direction is perpendicular to the first direction, and projections of the third radiator 121 and the first radiator 122 in the second direction at least partially overlap. The third radiator 121 is provided with a first feed point 141, and the first feed point 141 is electrically connected to or in a coupling connection to a feed unit 142, and is configured for feeding the antenna structure 120. "Extending in a first direction" in this application should be understood as that the radiator is in a straight strip shape and the straight strip shape extends in the first direction. Alternatively, the radiator is in a bent shape and the bent shape at least partially or integrally extends in the first direction. In this application, "being spaced in a second direction" should be understood as the radiators are integrally not in contact with each other in the second direction, and specifically, are evenly spaced from each other or are unevenly spaced from each other.

It should be understood that the "first position", the "second position", and the "third position" in this application should include a point of the side frame and/or a segment of the side frame. For example, "a first slot 131 is provided at the second position 102 on the side frame 11" may be understood as that the second position 102 includes the first slot 131 on the side frame, or the second position 102 is a position at which the first slot 131 is provided. For another example, "the second radiator 123 is electrically connected to the ground 110 at the third position 103" may be understood as that the third position 103 is a point on the side frame or a segment on the side frame, and the second radiator 123 includes the third position 103 and is grounded at the third position. Specifically, the second radiator 123 extends inwards from the third position to electrically connect to the ground 110, or the second radiator 123 is specifically connected to a spring contact or a fastening structure at the third position, and the spring contact or the fastening structure is electrically connected to the ground 110.

In an embodiment, the third radiator 121 extends in the first direction, or some edges of the third radiator 121 extend in the first direction. For example, an edge that is on the third radiator 121 and that is close to the first radiator 122 extends in the first direction.

It should be understood that, for brevity of description, this embodiment of this application is described by using only an example in which the third radiator 121 is configured as a feed stub. During actual application, the first feed point 141 may also be disposed on the first radiator 122, and the first radiator 122 is configured as the feed stub for feeding the antenna structure 120. Same technical effect may also be achieved. This is not limited in this application. In addition, in this application, the ground 110 may be understood as any one of the foregoing grounds, or a metal layer electrically connected to any one of the foregoing grounds.

In an embodiment, the first feed point 141 may be disposed at an end that is of the third radiator 121 and that is away from the second radiator 123. "An end/a first end/a second end (for example, an end of the third radiator 121) of the radiator" mentioned in this application cannot be understood as a point in a narrow sense, and may be considered as a radiator area that includes an endpoint and that is on the third radiator 121. For example, when a length of the third radiator 121 is L, it may be considered that the end of the third radiator 121 is an area within ¼ L away from the endpoint. In an embodiment, the "an end/a first end/a second end of the radiator" may be an area within 5 mm away from an end point of the radiator, or an area within 2 mm away from an end point of the radiator. In an embodiment, the first feed point 141 is disposed at a first end of the first radiator 122, and the first end of the first radiator 122 is an end close to the first position 101.

In the antenna structure 120 provided in this embodiment of this application, the third radiator 121 is configured as a feed stub for feeding the second radiator 123 in an electrical connection or coupling manner, so that the second radiator 123 generates radiation. The first radiator 122 and the third radiator 121 are spaced and coupled, and the first radiator 122 and the ground 110 are spaced and coupled. In an embodiment, a current of the third radiator 121 and a current of the second radiator 123 are basically in a same direction, and a current of the ground 110 and the current of the second radiator 123 are basically reverse. Therefore, the third radiator 121 and the ground 110 respectively generate reverse currents on the first radiator 122, and the reverse currents at least may partially counteract each other. When the third radiator is configured as the feed stub, the third radiator generates an induced current on the side frame of the electronic device, and the induced current is basically reverse to an induced current generated by the ground on the side frame, so that impact of the current on the ground 110 on the side frame 11 can be reduced. In this way, an SAR is reduced. That currents are basically in a same direction may be understood as that main directions (for example, directions of more than 70% of the currents) of the currents are the same. That currents are basically reverse may be understood as that main directions (for example, directions of more than 70% of the currents) of the currents are reverse. In addition, that main directions of the currents are in a same direction and are reverse does not mean that the main directions of the currents are in the same direction and are reverse in a spatial sense. Due to a spatial layout inside the electronic device, the shape of the radiator may not be a regular rectangle, and may be a fold line. The direction of the current may be understood as a vector direction of the radiator. When a bent portion does not have a current reverse point (zero point), bending of the radiator does not change the direction of the current.

It should be understood that the antenna structure 120 may have a plurality of operating modes, and the foregoing current distribution analysis may be applied to only one or more of the operating modes, and is not required to be applied to each operating mode. This is not limited in this application.

In an embodiment, an electrical length of the third radiator 121 may be less than a quarter of a first wavelength, and the first wavelength is a wavelength corresponding to an operating frequency band of the antenna structure 120. The wavelength corresponding to the operating frequency band of the antenna structure 120 may be considered as a wavelength corresponding to a center frequency of a frequency band supported by the antenna structure 120, or may be considered as a wavelength corresponding to a resonance point generated in the operating frequency band of the antenna structure 120. The electrical length may be indicated by a product of a physical length (namely, a mechanical length or a geometric length) and a ratio of transmission time of an electrical or electromagnetic signal in a medium to time required when the signal passes through a distance the same as the physical length of the medium in free space, and the electrical length may satisfy the following formula:

$$\bar{L} = L \times \frac{a}{b},$$

where

L is the physical length, a is the transmission time of the electrical or electromagnetic signal in the medium, and b is the transmission time in free space.

Alternatively, the electrical length may be a ratio of a physical length (namely, a mechanical length or a geometric length) to a wavelength of a transmitted electromagnetic wave. The electrical length may satisfy the following formula:

$$\bar{L} = \frac{L}{\lambda},$$

where

L is the physical length, and λ is the wavelength of the electromagnetic wave.

In an embodiment, resonance generated by the third radiator 121 is located in the operating frequency band of the antenna structure 120, or resonance generated by the third radiator 121 is adjusted to the operating frequency band of the antenna structure 120 in some manners (for example, by adding a matching circuit). In the antenna structure 120, the first radiator 123 is configured as a main radiator, and the third radiator 121 is configured as a feed stub, so that radiation of the antenna structure 120 in the first operating frequency band is weak. Therefore, an energy distribution ratio of the third radiator 121 and the first radiator 123 is extremely unbalanced. In an embodiment, the third radiator 121 does not generate resonance in the first operating frequency band of the antenna structure 120, a resonance frequency of the third radiator 121 is higher than a highest frequency in a first operating frequency band of the antenna structure 120, and the second radiator 123 is excited to generate radiation. In an embodiment, when an electrical length of the third radiator 121 is less than a quarter of a first wavelength, the second radiator 123 may be more fully excited, to ensure a radiation characteristic of the antenna structure 120. In an embodiment, different operating modes of the antenna structure 120 may be excited by using the third radiator 121, to extend bandwidth of the antenna structure 120. In an embodiment, the resonance frequency generated by the third radiator 121 may be configured to support the antenna structure 120 in operating in a second operating frequency band, where the second operating frequency band is higher than the first operating frequency band.

Figure 3:
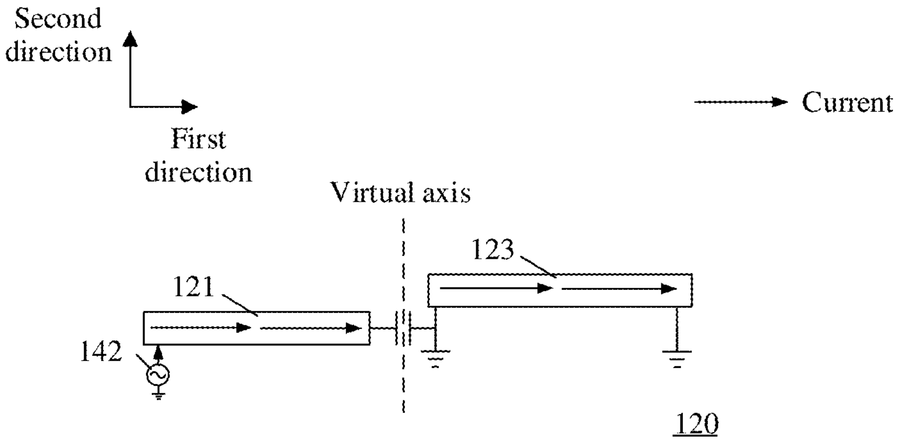
FIG. 3 is a schematic diagram of an operating mode of an antenna structure according to an embodiment of this application.
Figure 3:
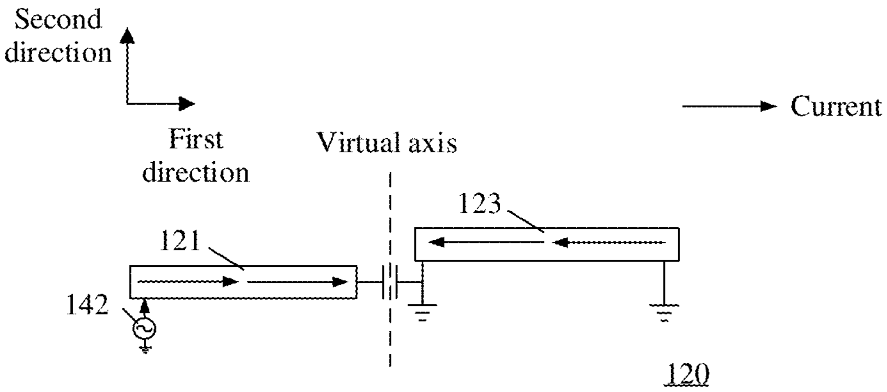

As shown in FIG. 3, because the third radiator 121 is in an extremely unbalanced operating state, two different operating modes of the antenna structure 120 may be excited. Herein, (a) in FIG. 3 shows a first operating mode of the antenna structure 120. In this operating mode, a current of the third radiator 121 and a current of the second radiator 123 are basically in a same direction on two sides of a virtual line. The virtual line may be any line between the third radiator 121 and the second radiator 123, and is perpendicular to the first direction. Herein, (b) in FIG. 3 shows a second operating mode of the antenna structure 120. In this operating mode, a current of the third radiator 121 and a current of the second radiator 123 are basically reverse on two sides of a virtual line. By disposing the third radiator 121 that is configured as the feed stub, a mode of the second radiator 123 may be increased, so that an operating mode of the antenna structure 120 is increased, and bandwidth of the antenna structure 120 is extended.

In an embodiment, the second radiator 123 is electrically connected to the ground 110 at an end of the first slot 131, and the second radiator 123 is electrically connected to the ground 110 at the third position 103. For example, the second radiator 123 is electrically connected to the ground 110 at an end of the first slot 131.

In an embodiment, a third slot 133 is provided at the first position 101 of the side frame 11. Further, the first slot 131 and the third slot 133 may be filled with a medium, to improve physical strength of the side frame 11. The second slot 132 may be filled with a plastic particle, for example, a flame-retardant material (FR-4) or another material.

In an embodiment, the antenna structure 120 may further include a tuner (tuner) 151. One end of the tuner 151 is electrically connected to the second radiator 123 at an end of the first slot 131, and the other end of the tuner 151 is electrically connected to the ground 110. In an embodiment, the second radiator 123 generates resonance in an operating frequency band by using the tuner. In an embodiment, the tuner 151 may be configured to adjust single resonance generated by the antenna structure 120. In an embodiment, the second radiator 123 switches electrical connection relationships with different electronic elements by using the tuner, to change a resonant frequency band of the antenna structure 120, so that the antenna structure 120 operates in different frequency band ranges.

The third radiator 121 in the antenna structure 120 performs feeding on the second radiator 123 in a manner of electrically connecting to or coupling to the second radiator 123.

In an embodiment, the third radiator 121 and the second radiator 123 are spaced in a direction, and projections of the third radiator 121 and the second radiator 123 in the direction at least partially overlap, to provide the foregoing coupling manner. It should be understood that a direction in which the third radiator 121 and the second radiator 123 are spaced may be the first direction, the second direction, or any other direction, and is set based on a spatial layout in a housing of the electronic device. This is not limited in this application.

In an embodiment, the antenna structure 120 may further include a capacitor 152. The capacitor 152 may be connected in series between the third radiator 121 and the second radiator 123. One end of the capacitor 152 is electrically connected to the third radiator 121, and the other end of the capacitor 152 is electrically connected to the second radiator 123. For example, one end of the capacitor 152 may be electrically connected to the second radiator 123 at an end of the first slot 131, and the other end of the capacitor 152 may be electrically connected to an end of the third radiator 121. In an embodiment, by adjusting a capacitance value of the capacitor 152, energy transmitted from the third radiator 121 to the second radiator 123 may be controlled, to control a radiation characteristic of the antenna structure 120. In an embodiment, a capacitance value of the capacitor 152 is less than or equal to 1 pF. In this embodiment of this application, only an example in which a capacitance value of the capacitor 152 is 0.2 pF is used for description. During actual application, the capacitance value may be adjusted based on a production or design requirement. This is not limited in this application.

In an embodiment, the antenna structure may further include a capacitor 153. The capacitor 153 may be connected in series between the third radiator 121 and the first radiator 122. A first end of the capacitor 153 is electrically connected to the third radiator 121, and a second end of the capacitor 153 is electrically connected to the first radiator 122. In an embodiment, a second end of the capacitor 153 may be electrically connected to the first radiator 122 at an end of the first slot 131. In an embodiment, a first end of the capacitor 153 may be electrically connected to an end that is of the third radiator 121 and that is close to the second position 102. In an embodiment, by adjusting a capacitance value of the capacitor 153, energy transmitted from the third radiator 121 to the first radiator 122 may be controlled, to control a radiation characteristic of the antenna structure 120.

In an embodiment, the third radiator 121 may have a part that bends towards the second radiator 123, and/or the second radiator 123 may have a part that bends towards the third radiator 121, to provide the foregoing electrical connection or coupling manner on the bent part.

Figure 4:
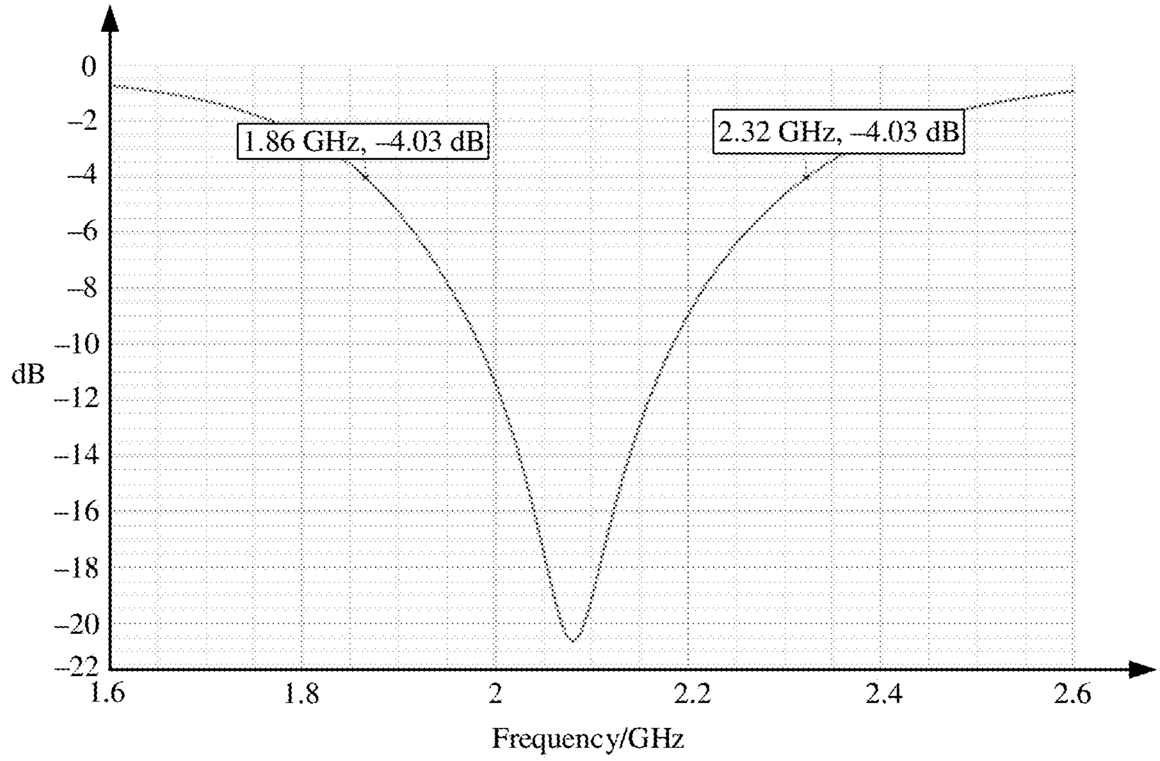
FIG. 4 is an S-parameter simulation diagram of an antenna structure shown in FIG. 2.
Figure 5:
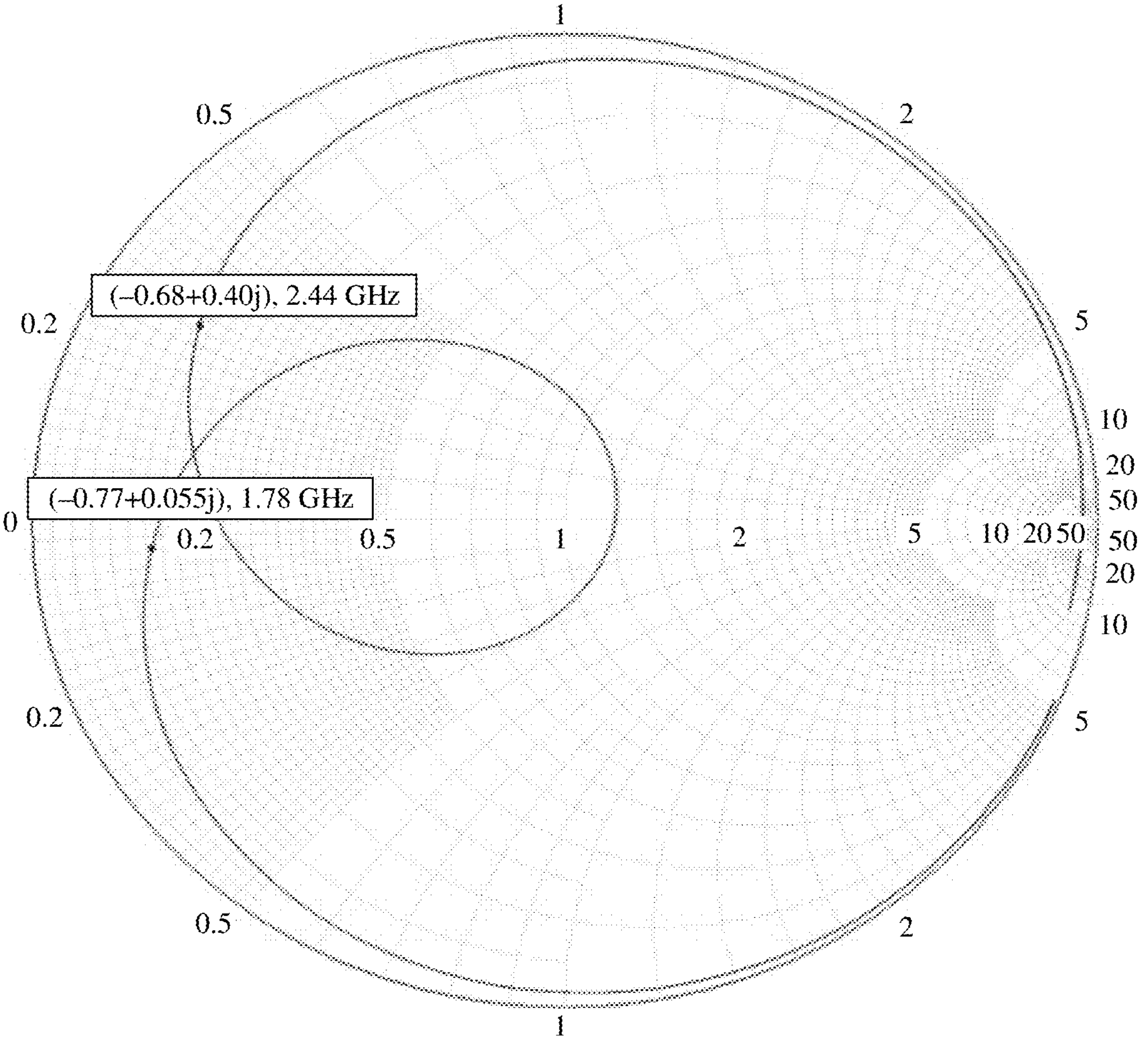
FIG. 5 is a Smith chart of an antenna structure shown in FIG. 2.
Figure 6:
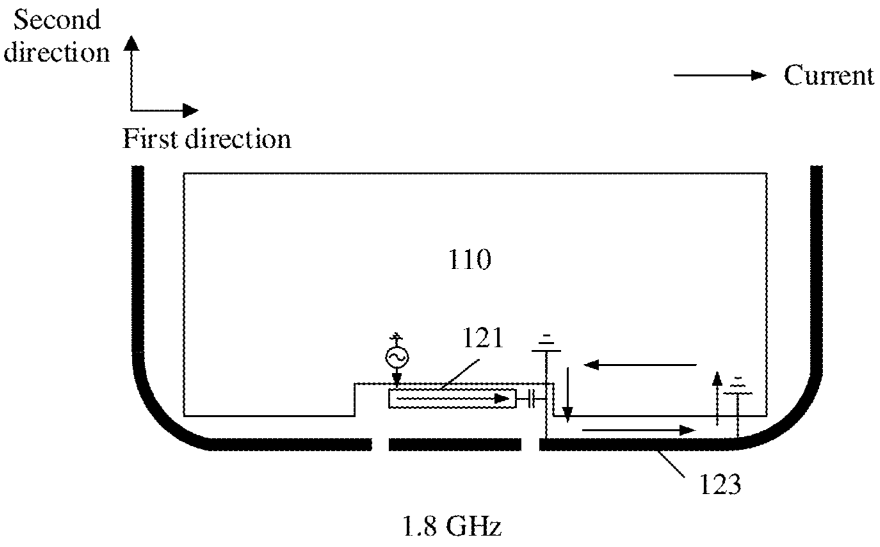
FIG. 6 is a schematic diagram of current distribution of an antenna structure shown in FIG. 2 at 1.8 GHz.
Figure 7:
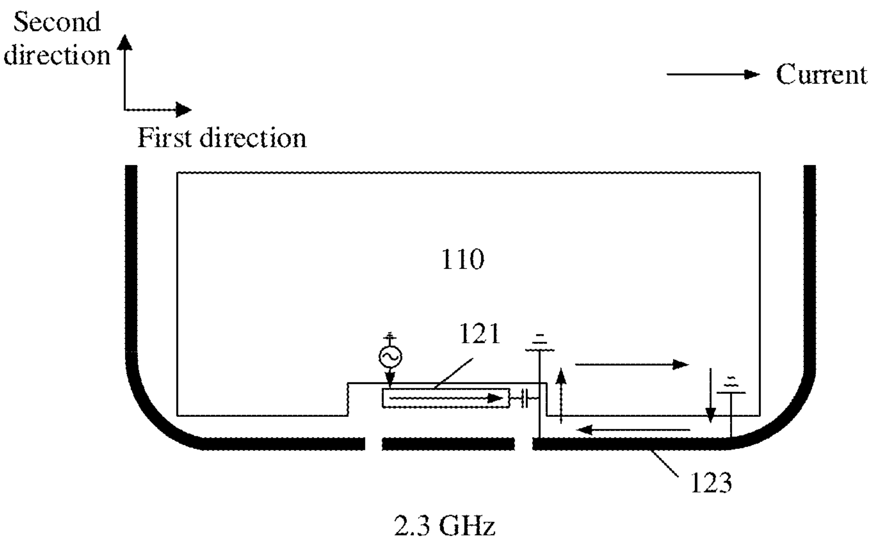
FIG. 7 is a schematic diagram of current distribution of an antenna structure shown in FIG. 2 at 2.3 GHZ.
Figure 8:
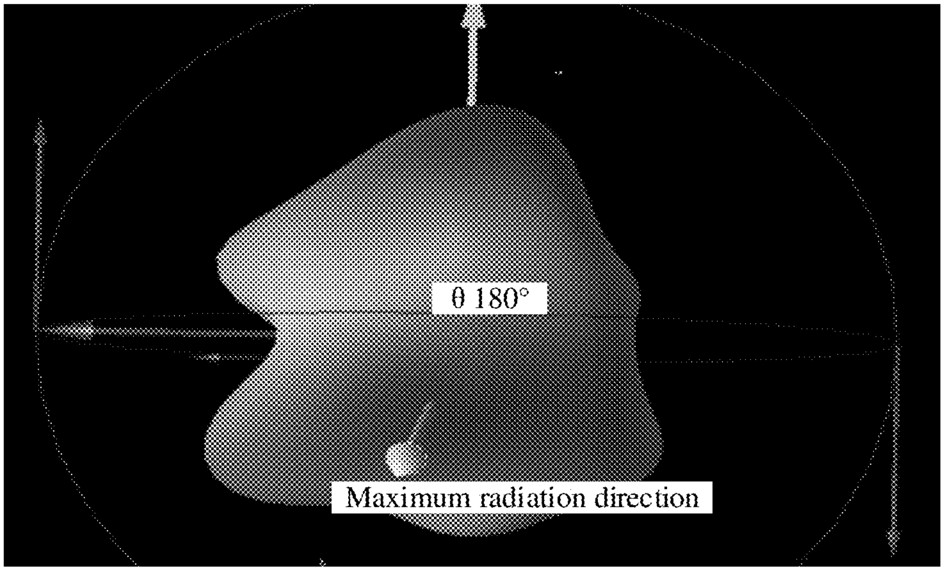
FIG. 8 is a pattern of an antenna structure shown in FIG. 2 at 1.8 GHz.
Figure 9:
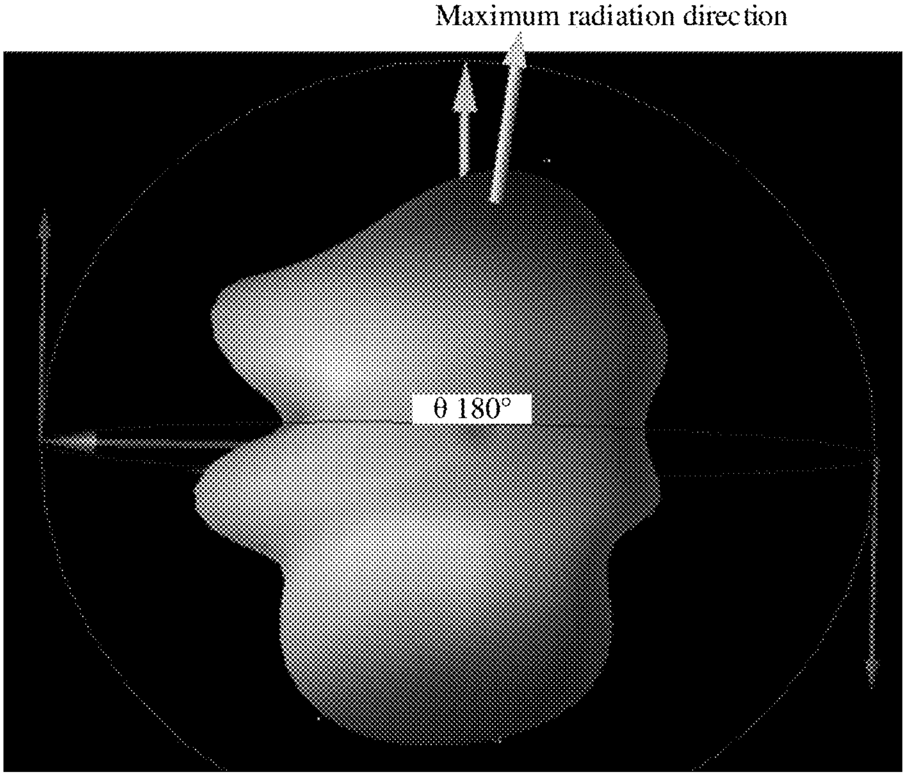
FIG. 9 is a pattern of an antenna structure shown in FIG. 2 at 2.3 GHZ.

FIG. 4 and FIG. 9 are diagrams of simulation results of an antenna structure shown in FIG. 2. FIG. 4 is an S-parameter simulation diagram of an antenna structure shown in FIG. 2. FIG. 5 is a Smith chart of an antenna structure shown in FIG. 2. FIG. 6 is a schematic diagram of current distribution of an antenna structure shown in FIG. 2 at 1.8 GHz. FIG. 7 is a schematic diagram of current distribution of an antenna structure shown in FIG. 2 at 2.3 GHZ. FIG. 8 is a pattern of an antenna structure shown in FIG. 2 at 1.8 GHz. FIG. 9 is a pattern of an antenna structure shown in FIG. 2 at 2.3 GHZ.

It should be understood that, for brevity of description, in this embodiment of this application, a B1 frequency band in LTE is used as an example for description, and a communication frequency band to which the technical solutions provided in this application are applied is not limited.

As shown in FIG. 4, by using S11 less than −4 dB as a boundary, a resonant frequency band of the antenna structure may include 1.86 GHz to 2.32 GHZ, and may include a transmit frequency band (1920 MHz to 1980 MHZ) and a receive frequency band (2110 MHz to 2170 MHz) of a B1 frequency band in LTE, so that an electronic device can operate normally in the B1 frequency band.

As shown in FIG. 5, in the Smith chart, frequencies 1.78 GHz and 2.44 GHz are respectively located on two sides of a zero axis. It is generally considered that when a curve passes through the zero axis once, the antenna structure has one operating mode. Therefore, the antenna structure has two operating modes, which correspond to the operating modes of the antenna structure shown in FIG. 3.

FIG. 6 is a schematic diagram of current distribution of an antenna structure at 1.8 GHz. A current of the third radiator 121 and a current of the second radiator 123 are basically in a same direction on two sides of a virtual line, and correspond to the first operating mode of the antenna structure shown in (a) in FIG. 3. Therefore, resonance generated in the first operating mode of the antenna structure is mainly located in a low frequency band in the operating frequency band of the antenna structure, and may include the transmit frequency band (1920 MHz to 1980 MHz) of the B1 frequency band.

FIG. 7 is a schematic diagram of current distribution of an antenna structure at 2.3 GHz. A current of the third radiator 121 and a current of the second radiator 123 are basically reverse in direction on two sides of a virtual line, and correspond to the second operating mode of the antenna structure shown in (b) in FIG. 3. Therefore, resonance generated in the first operating mode of the antenna structure is mainly located in a high frequency band in the operating frequency band of the antenna structure, and may include the receive frequency band (2110 MHz to 2170 MHz) of the B1 frequency band.

As shown in FIG. 8 and FIG. 9, because current distribution in the first operating mode of the antenna structure is different from that in the second operating mode of the antenna structure, maximum radiation directions of the antenna structure at 1.8 GHz and 2.3 GHz are basically perpendicular. Therefore, directions covered by the first operating mode and the second operating mode of the antenna structure are different. In an embodiment, the maximum radiation direction of the antenna structure may be adjusted based on different handheld manners of the user, to effectively improve user experience and avoid signal fading caused by a handheld posture of the user.

Figure 10:
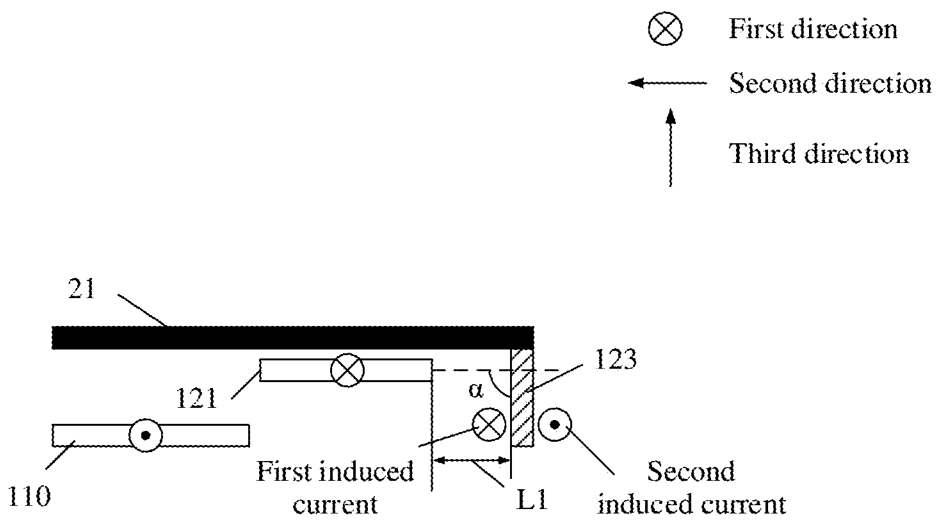
FIG. 10 is a schematic diagram of a cross section of an electronic device in a second direction.
Figure 11:
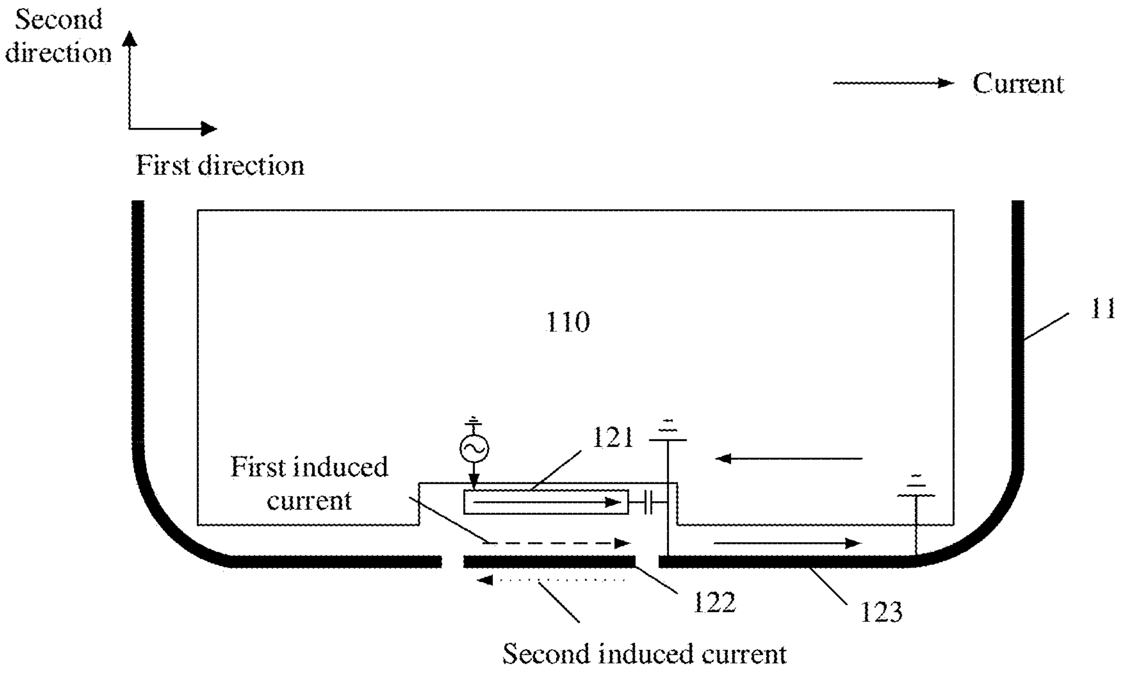
FIG. 11 is a schematic diagram of current distribution according to an embodiment of this application.

FIG. 10 and FIG. 11 are schematic diagrams of an electronic device according to an embodiment of this application. FIG. 10 is a schematic diagram of a cross section of an electronic device in a second direction. FIG. 11 is a schematic diagram of current distribution according to an embodiment of this application.

As shown in FIG. 10, the third radiator 121 is located between the ground 110 and the rear cover 21 of the electronic device in a third direction, where the third direction is a thickness direction of the electronic device. For example, a spacing between the third radiator 121 and the rear cover 21 is less than a spacing between the ground 110 and the rear cover 21. In an embodiment, the third radiator 121 is located between the ground 110 and the cover glass 13 of the electronic device in the third direction. For example, a spacing between the third radiator 121 and the cover glass 13 is less than a spacing between the ground 110 and the cover glass 13. It should be understood that the third radiator 121 may be partially or completely staggered with the ground 110 in the third direction. In an embodiment, the third radiator 121 may be disposed on a support between the ground 110 and the rear cover 21/cover glass 13 of the electronic device. For example, the third radiator 121 is formed by embedding a steel sheet in the support, or the third radiator 121 is formed on the support by using a laser-direct-structuring (laser-direct-structuring, LDS) technology. The third radiator 121 may alternatively be implemented in another manner, for example, implemented in a form of a floating metal (floating metal, FLM) or a flexible circuit board (flexible printed circuit, FPC). This is not limited in this application.

In an embodiment, the third radiator 121 is a metal sheet, for example, a steel sheet, and the metal sheet is disposed in an extension direction of the ground 110. A thickness of the metal sheet is less than a thickness of the side frame 11, for example, less than a thickness of a narrowest part of the side frame 11.

In an embodiment, the third radiator 121 may be in a rectangular shape, a broken line shape, a U shape, or an irregular shape. This is not limited in this application. In an embodiment, a shape, a size, a thickness, and the like of the third radiator 121 may be adjusted based on relative positions between the ground 110, the first radiator 122, the second radiator 123, and the third radiator 121, to effectively use internal space of the electronic device. In an embodiment, a parameter like a shape, a size, a thickness, or an electrical length of the third radiator 121 may be further adjusted based on an actual production or design requirement, so that an amplitude of a second induced current generated by the third radiator 121 on the first radiator 122 is approximately the same as an amplitude of the first induced current. In this way, an SAR of the antenna structure is effectively reduced.

It should be understood that, the SAR is used as a transmit index of the antenna. For the antenna structure shown in FIG. 2, an operating mode corresponding to the transmit frequency band (1920 MHz to 1980 MHz) of the antenna structure is the first operating mode, as shown in (a) in FIG. 3.

As shown in FIG. 11, a first slot and a third slot are provided at a first position and a second position of the side frame 11. In this case, the first radiator 122 is a floating stub, and two ends of the first radiator 122 are not electrically connected to the ground 110. For the first radiator 122, a current of the first radiator 122 mainly includes two parts: One part is a first induced current caused on the first radiator 122 due to a current generated by a radiation stub (the second radiator 123) of the antenna structure on the ground 110, and the first induced current is basically in a same direction as a current on the second radiator 123. The other part is a second induced current generated on the first radiator 122 by a feed stub (the third radiator 121) of the antenna structure, the second induced current is basically reverse to a current on the third radiator 121. That is, both the first introduced current and the second introduced current exist on the first radiator 122, and directions of the first introduced current and the second introduced current are reverse. When an amplitude of the first induced current is close to an amplitude of the second induced current, a presented result is that at least some currents counteract each other, and a current zero point appears. Because a magnetic field is generated by the current, in this antenna structure, magnetic fields generated by the first induced current and the second induced current in opposite phases (with a phase difference of approximately) 180° counteract each other, and a zero point (or a close to zero point) of the magnetic field appears. In this way, an SAR of the antenna structure is reduced.

It should be understood that, in the antenna structure provided in this embodiment of this application, a part of the side frame of the electronic device is configured as a radiator. In a design of the antenna structure, a relative position of the third radiator 121 may be adjusted by adjusting a relative position of the third radiator 121 and a capacitance value of a capacitor between the third radiator 121 and the second radiator 123, that is, relative positions of the ground 110, the first radiator 122, and the second radiator 123, and the third radiator 121 are adjusted by adjusting the relative position of the third radiator. Because an amplitude of the second induced current generated by the third radiator 121 on the first radiator 122 is the same as an amplitude of the first induced current, an SAR of the antenna structure is effectively reduced.

In an embodiment, the first radiator 122 is configured to at least partially cancel the first induced current and the second induced current in a resonant frequency band generated by the second radiator 123, and the first radiator 122 does not generate resonance in the resonant frequency band generated by the second radiator 123. In an embodiment, a resonant frequency band generated by the first radiator 122 may be outside the resonant frequency band generated by the second radiator 123. Correspondingly, a length of the first radiator 122 may be different from a length of the second radiator 123, the length of the first radiator 122 may be greater than or less than the length of the second radiator 123, and the resonant frequency band generated by the first radiator 122 may be higher than or less than the resonant frequency band generated by the second radiator 123. The length may be understood as an electrical length or a physical length.

In an embodiment, the resonant frequency band generated by the first radiator 122 may be configured to extend a communication frequency band of the antenna structure, so that the antenna structure operates in more communication frequency bands, to improve user experience.

In an embodiment, a following position at which the third radiator 121 is disposed affects an amplitude of the second induced current generated by the third radiator 121 on the first radiator 122: 1. A distance Li between the third radiator 121 and the first radiator 122, as shown in FIG. 10. 2. In a plane formed by the first direction and the second direction, an angle α between the third radiator 121 and the first radiator 122, namely, an area of the third radiator 121 facing the first radiator 122. 3. A medium between the third radiator 121 and the first radiator 122. This is not limited in this application, and the foregoing is merely used as an example.

Figure 12:
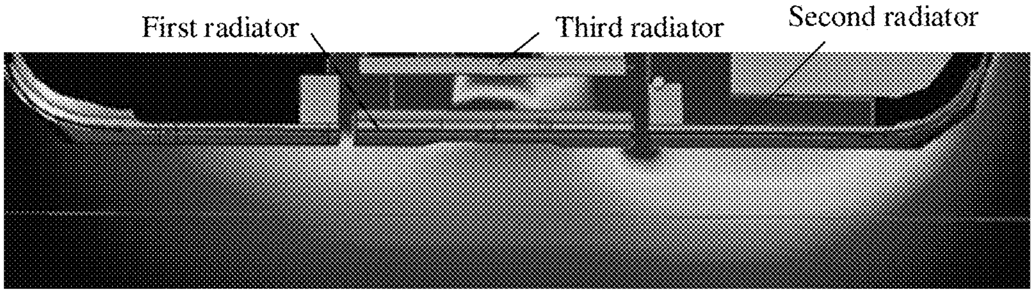
FIG. 12 is a schematic diagram of magnetic field distribution of an antenna structure shown in FIG. 2.

FIG. 12 is a schematic diagram of magnetic field distribution of an antenna structure shown in FIG. 2.

As shown in FIG. 12, magnetic fields generated by using a first induced current and a second induced current in opposite phases (with a phase difference of approximately 180°) counteract each other. Outside the electronic device, a magnetic field near the first radiator has a zero point (or a close to zero point), and a magnetic field of the antenna structure has no strong point, so that an SAR of the antenna structure can be effectively reduced.

Figure 13:
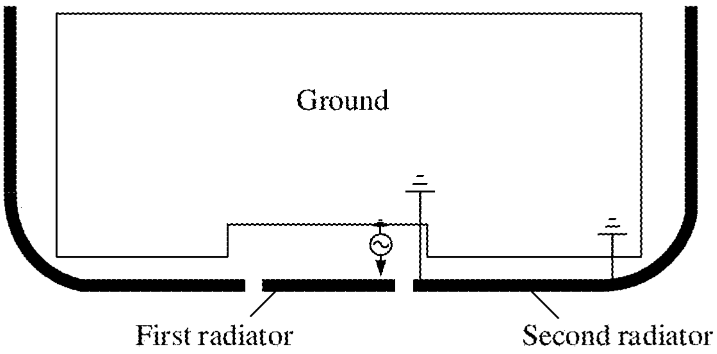
FIG. 13 is a schematic diagram of another antenna structure according to an embodiment of this application.

FIG. 13 is a schematic diagram of another antenna structure according to an embodiment of this application.

As shown in FIG. 13, a difference between the antenna structure and the antenna structure shown in FIG. 2 lies only in that the antenna structure does not include a third radiator, and the first radiator is configured as a feed stub for feeding the antenna structure. The other parts of the antenna structure are the same as those of the antenna structure shown in FIG. 2. The antenna structure shown in FIG. 13 is used as an antenna structure for comparison in this application.

The following Table 1 shows measured results of the antenna structure shown in FIG. 2 and the antenna structure shown in FIG. 13.

TABLE 1

| | Antenna structure shown in FIG. 2 | Antenna structure shown in FIG. 13 |
|---|---|---|
| Free space (free space, FS) efficiency | −1.23 dB | −2.1 dB |
| SAR | 2 W/Kg | 2.65 W/Kg |
| Normalized SAR (−4 dB) | 1.06 W/Kg | 1.75 W/Kg |

As shown in the foregoing Table 1, under a same condition, an SAR value of the antenna structure (the antenna structure shown in FIG. 2) provided in this embodiment of this application is greatly improved compared with that of the compared antenna structure (the antenna structure shown in FIG. 13).

Figure 14:
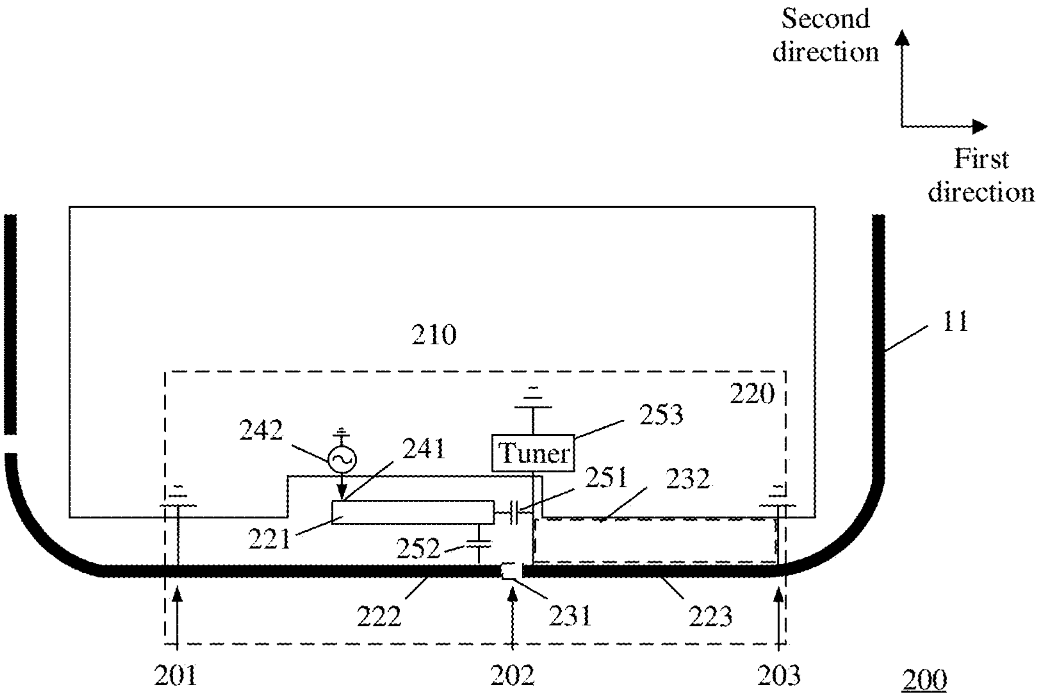
FIG. 14 is a schematic diagram of a structure of an electronic device 200 according to an embodiment of this application.

FIG. 14 is a schematic diagram of a structure of an electronic device 200 according to an embodiment of this application.

As shown in FIG. 14, the electronic device 200 may include the side frame 11, a ground 210, and an antenna structure 220.

A first position 201, a second position 202, and a third position 203 are sequentially disposed on a part of the side frame 11. A side frame 11 between the first position 201 and the second position 202 is configured as a first radiator 222 of the antenna structure 220, and a side frame 11 between the second position 202 and the third position 203 is configured as a second radiator 223 of the antenna structure 220. A first slot 231 is provided at the second position 202 of the side frame 11. A second slot 232 is formed between the second radiator 223 and the ground 210. The first radiator 222 is not provided with a slot at the first position 201, and the first radiator 222 is electrically connected to the ground 210 at the first position 201. The second radiator 223 is not provided with a slot at the third position 203, and the second radiator 222 is electrically connected to the ground 210 at the third position 203. The antenna structure 220 may include a third radiator 221 disposed in a housing of the electronic device 200. The first radiator 222 extends in a first direction, and is spaced from the third radiator 221 in a second direction. The second direction is perpendicular to the first direction, and projections of the third radiator 221 and the first radiator 222 in the second direction at least partially overlap. The third radiator 221 is provided with a first feed point 241, and the first feed point 241 is electrically connected to a feed unit 242, and is configured for feeding the antenna structure 220.

In an embodiment, the third radiator 221 extends in the first direction, or some edges of the third radiator 221 extend in the first direction. For example, an edge that is on the third radiator 221 and that is close to the first radiator 222 extends in the first direction.

The third radiator 221 in the antenna structure 120 performs feeding on the second radiator 223 in a manner of electrically connecting to or coupling to the second radiator 223.

In an embodiment, the third radiator 221 and the second radiator 223 are spaced in a direction, and projections of the third radiator 221 and the second radiator 223 in the direction at least partially overlap, to provide the foregoing coupling manner. It should be understood that a direction in which the third radiator 221 and the second radiator 223 are spaced may be the first direction, the second direction, or any other direction, and is set based on a spatial layout in a housing of the electronic device. This is not limited in this application.

In an embodiment, the antenna structure 220 may further include a first capacitor 251. The first capacitor 251 may be connected in series between the third radiator 221 and the second radiator 223. A first end of the first capacitor 251 is electrically connected to the third radiator 221, and a second end of the first capacitor 251 is electrically connected to the second radiator 223. In an embodiment, a first end of the first capacitor 251 may be electrically connected to an end that is of the third radiator 221 and that is close to the second position 202. In an embodiment, a second end of the first capacitor 251 may be electrically connected to the second radiator 223 at an end of the first slot 231. In an embodiment, by adjusting a capacitance value of the first capacitor 251, energy transmitted from the third radiator 221 to the second radiator 223 may be controlled, to control a radiation characteristic of the antenna structure 220.

In an embodiment, a capacitance value of the first capacitor 251 is less than or equal to 1 pF. In this embodiment of this application, only an example in which a capacitance value of the first capacitor 251 is 0.2 pF is used for description. During actual application, the capacitance value may be adjusted based on a production or design requirement. This is not limited in this application.

In an embodiment, the third radiator 221 may have a part that bends towards the second radiator 223, and/or the second radiator 223 may have a part that bends towards the third radiator 221, to provide the foregoing electrical connection or coupling manner on the bent part.

In the antenna structure 220 provided in this embodiment of this application, the third radiator 221 is configured as a feed stub for feeding the second radiator 223 in an electrical connection or coupling manner, so that the second radiator 223 generates radiation. The first radiator 222 is electrically connected to or coupled to the third radiator 221, and the first radiator 222 is electrically connected to the ground 210 at the first position 201. In an embodiment, a current of the third radiator 221 and a current of the second radiator 223 are basically in a same direction, and a current of the ground 110 and the current of the second radiator 123 are basically reverse. Therefore, the third radiator 121 and the ground 110 respectively generate reverse included currents on the first radiator 122, and the reverse induced currents at least may partially counteract each other. When the third radiator is configured as the feed stub, the third radiator generates a current on the side frame of the electronic device, and the current is basically reverse to a current generated by the ground on the side frame, so that impact of the current on the ground 110 on the side frame 11 can be reduced. In this way, an SAR is reduced.

In an embodiment, the third radiator 221 and the first radiator 222 are spaced by a specific distance, to provide the foregoing coupling manner.

In an embodiment, the antenna structure 220 may further include a second capacitor 252. The second capacitor 252 may be connected in series between the third radiator 221 and the first radiator 222. A first end of the second capacitor 252 is electrically connected to the third radiator 221, and a second end of the second capacitor 252 is electrically connected to the first radiator 222. In an embodiment, a second end of the second capacitor 252 may be electrically connected to the first radiator 222 at an end of the first slot 231. In an embodiment, a first end of the second capacitor 252 may be electrically connected to an end that is of the third radiator 221 and that is close to the second position 202. In an embodiment, by adjusting a capacitance value of the second capacitor 252, energy transmitted from the third radiator 221 to the first radiator 222 may be controlled, to control a radiation characteristic of the antenna structure 220.

In an embodiment, a capacitance value of the second capacitor 252 is less than or equal to 1 pF. In this embodiment of this application, only an example in which a capacitance value of the second capacitor 252 is 0.2 pF is used for description. During actual application, the capacitance value may be adjusted based on a production or design requirement. This is not limited in this application.

In an embodiment, the third radiator 221 may have a part that bends towards the first radiator 222, and/or the first radiator 222 may have a part that bends towards the third radiator 221, to provide the foregoing electrical connection or coupling manner on the bent part.

In an embodiment, the antenna structure 220 may further include a tuner 253. One end of the tuner 253 is electrically connected to the second radiator 223 at an end of the first slot 231, and the other end of the tuner 253 is electrically connected to the ground 210. The tuner 253 may be configured to switch between different electronic elements electrically connected to the second radiator 223, to change resonance of the antenna structure 120, so that the antenna structure 120 operates in different frequency bands. It should be understood that the tuner 253 may alternatively be disposed at the third position 203 and connected between the ground 310 and the second radiator 223. This is not limited in this application.

In an embodiment, an electrical length of the third radiator 221 may be less than a quarter of a first wavelength, and the first wavelength is a wavelength corresponding to an operating frequency band of the antenna structure 220. Resonance generated by the third radiator 221 is located in the operating frequency band of the antenna structure 220, or resonance generated by the third radiator 221 is adjusted to the operating frequency band of the antenna structure 220 in some manners (for example, by adding a matching circuit). This is similar to that in the foregoing embodiment, and details are not described herein again.

It should be understood that a relative position (for example, between the ground 110 and the rear cover 21/cover glass 13 of the electronic device) of the third radiator 221 in the electronic device, an implementation form (for example, a steel sheet embedded in the support, an LDS, a floating metal, or a flexible circuit board), a shape of the third radiator 221, or the like are similar to that in the foregoing embodiment. Details are not described herein again.

Figure 15:
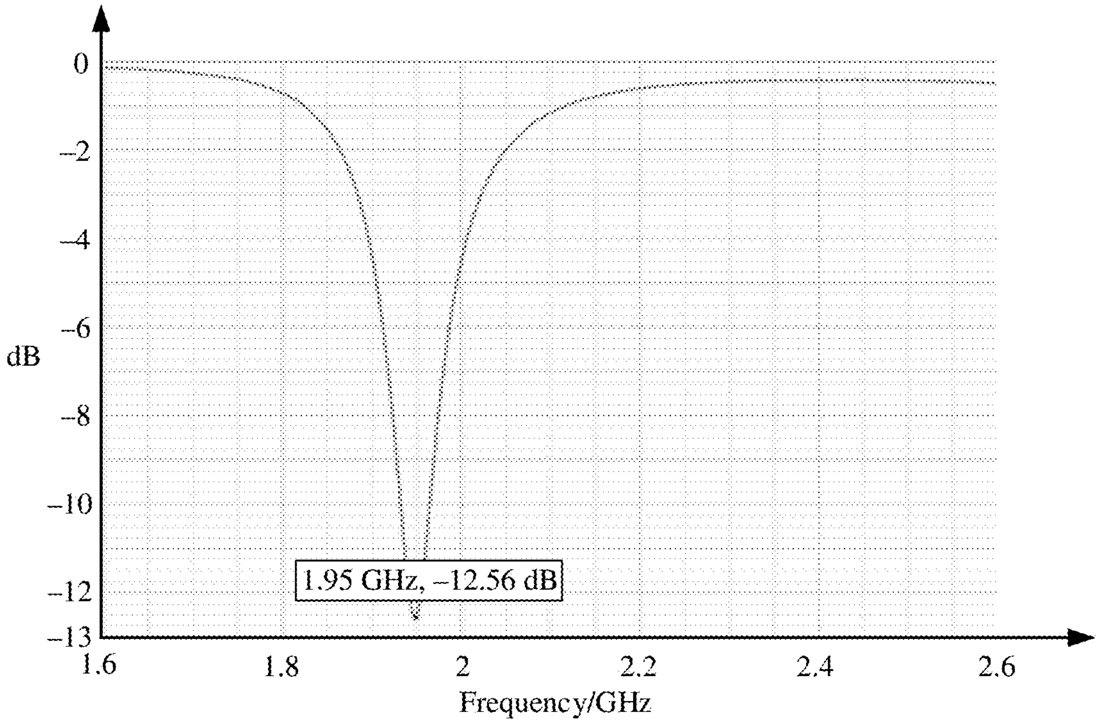
FIG. 15 is an S-parameter simulation diagram of an antenna structure shown in FIG. 14.

FIG. 15 is an S-parameter simulation diagram of an antenna structure shown in FIG. 14.

As shown in FIG. 15, by using S11 less than-4 dB as a boundary, a resonant frequency band of the antenna structure may include a transmit frequency band (1920 MHz to 1980 MHz) and a receive frequency band (2110 MHz to 2170 MHz) of a B1 frequency band in LTE, so that an electronic device can operate normally in the B1 frequency band.

Figure 16:
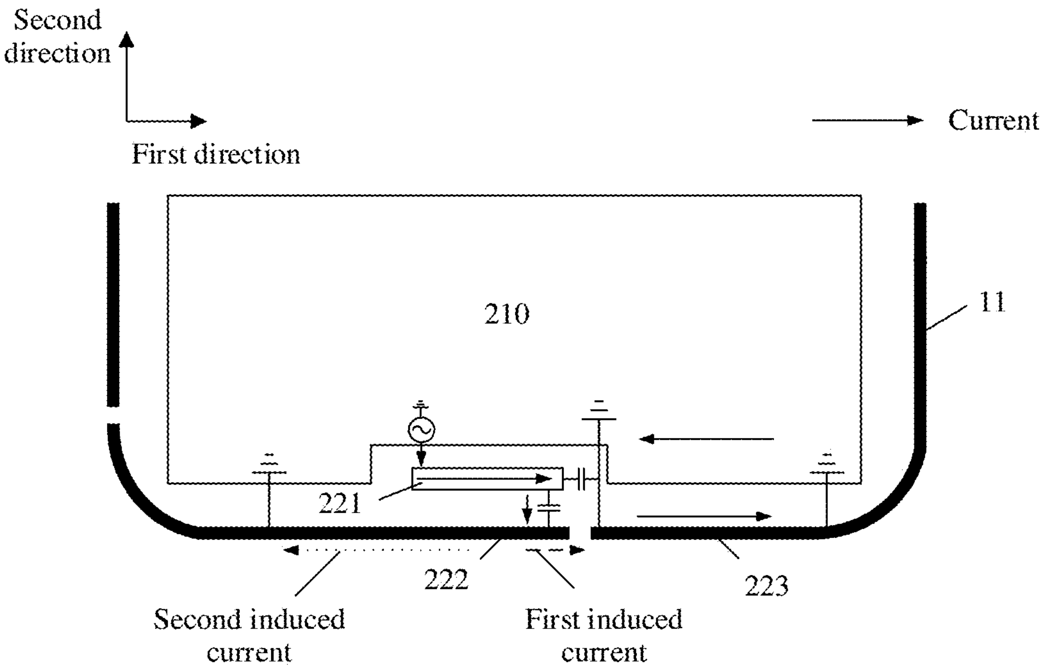
FIG. 16 is a schematic diagram of current distribution according to an embodiment of this application.

FIG. 16 is a schematic diagram of current distribution according to an embodiment of this application.

As shown in FIG. 16, the side frame 11 is provided with a first slot at the second position, and the first radiator 222 is electrically connected to the ground 210 at the first position. For the first radiator 222, a current of the first radiator 222 mainly includes two parts: One part is a first induced current caused on the first radiator 222 due to a current generated by a radiation stub (the second radiator 223) of the antenna structure on the ground 210, and the first induced current is basically in a same direction as a current on the second radiator 223. The other part is a second induced current generated on the first radiator 222 by a feed stub (the third radiator 221) of the antenna structure, the second induced current is basically reverse to a current on the third radiator 221. That is, both the first introduced current and the second introduced current exist on the first radiator 222, and directions of the first introduced current and the second introduced current are reverse. When an amplitude of the first induced current is close to an amplitude of the second induced current, a presented result is that at least some currents counteract each other, and a current zero point appears. Because a magnetic field is generated by the current, in this antenna structure, magnetic fields generated by the first induced current and the second induced current in opposite phases (with a phase difference of approximately 180°) counteract each other, and a zero point (or a close to zero point) of the magnetic field appears. In this way, an SAR of the antenna structure is reduced.

In an embodiment, the first radiator 222 is configured to at least partially cancel the first induced current and the second induced current in a resonant frequency band generated by the second radiator 223. Therefore, the first radiator 222 does not generate resonance in the resonant frequency band generated by the second radiator 223, and a resonant frequency band generated by the first radiator 222 should be outside the resonant frequency band generated by the second radiator 223. In addition, for a structure in which an end of the first radiator 222 is grounded, when a resonant frequency band of the first radiator 222 is higher than a resonant frequency band of the second radiator 223, a current on the first radiator 222 is large, and an SAR value is high. Therefore, a length of the first radiator 222 may be greater than a length of the second radiator 223, so that a resonant frequency band generated by the first radiator 222 may be lower than a resonant frequency band generated by the second radiator 223. The length may be understood as an electrical length or a physical length. In addition, the resonant frequency band generated by the first radiator 222 may be configured to extend a low-frequency communication frequency band of the antenna structure, so that the antenna structure operates in more communication frequency bands, to improve user experience.

Figure 17:
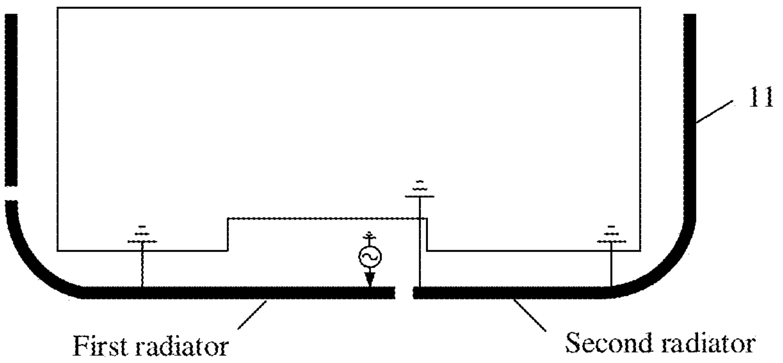
FIG. 17 is a schematic diagram of another antenna structure according to an embodiment of this application.

FIG. 17 is a schematic diagram of another antenna structure according to an embodiment of this application.

As shown in FIG. 17, a difference between the antenna structure and the antenna structure shown in FIG. 14 lies only in that the antenna structure does not include a third radiator, and the first radiator is configured as a feed stub for feeding the antenna structure. The other parts of the antenna structure are the same as those of the antenna structure shown in FIG. 14. The antenna structure shown in FIG. 17 is configured as an antenna structure for comparison in this application.

Figure 18:
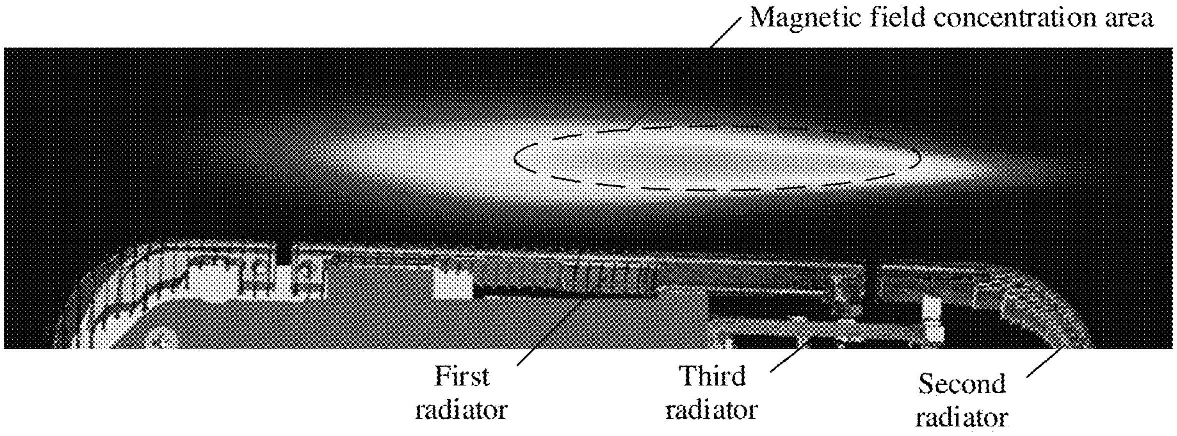
FIG. 18 is a schematic diagram of magnetic field distribution of an antenna structure shown in FIG. 14.
Figure 19:
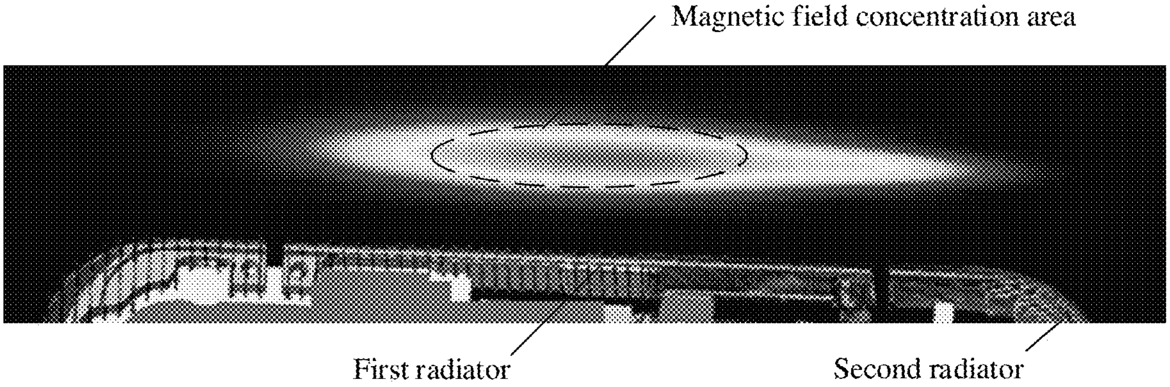
FIG. 19 is a schematic diagram of magnetic field distribution of the antenna structure shown in FIG. 17.

FIG. 18 and FIG. 19 are respectively schematic diagrams of magnetic field distribution of the antenna structures shown in FIG. 14 and FIG. 17.

As shown in FIG. 18 and FIG. 19, compared with the antenna structure shown in FIG. 17, the antenna structure shown in FIG. 14 uses the first induced current and the second induced current in opposite phases (with a phase difference of approximately 180°), so that generated magnetic fields counteract each other. The magnetic fields generated by the antenna structure are distributed evenly, and there is no strong point in several areas of the magnetic fields of the antenna structure, so that an SAR of the antenna structure can be effectively reduced.

The following Table 2 and Table 3 show measured results of the antenna structure shown in FIG. 14 and the antenna structure shown in FIG. 17.

TABLE 2

(Antenna structure shown in FIG. 14)

| Test frequency band | FS efficiency | SAR | Normalized SAR (−4 dB) |
|---|---|---|---|
| B3 | −4 dB | 1.1 W/Kg | 1.1 W/Kg |
| B1 | −3.2 dB | 1.31 W/Kg | 1.08 W/Kg |
| B7 | −3.4 dB | 1.02 W/Kg | 0.9 W/Kg |

TABLE 3

(Antenna structure shown in FIG. 17)

| Test frequency band | FS efficiency | SAR | Normalized SAR (−4 dB) |
|---|---|---|---|
| B3 | −3 dB | 1.99 W/Kg | 1.58 W/Kg |
| B1 | −2.1 dB | 2.25 W/Kg | 1.45 W/Kg |
| B7 | −2.8 dB | 2.53 W/Kg | 1.91 W/Kg |

As shown in Table 2 and Table 3, when the antenna structures provided in embodiments of this application are the same, an SAR value of the antenna structure is greatly improved compared with that of the compared antenna structure.

A person skilled in the art may use different methods to implement the described functions for each specific application, but such implementation should not be considered beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising:

an antenna structure, comprising a first radiator, a second radiator, and a third radiator;

a ground, wherein the antenna structure is grounded through the ground; and a side frame, wherein a part of the side frame has a first position, a second position, and a third position in sequence, a first portion of the side frame that is between the first position and the second position is configured as the first radiator, and a second portion of the side frame that is between the second position and the third position is configured as the second radiator, wherein:

a first slot is at the second position of the side frame;

a second slot is between the second radiator and the ground;

the first radiator extends in a first direction, and is spaced from the third radiator in a second direction, the second direction is perpendicular to the first direction, and a virtual straight line that extends in the second direction passes through the third radiator and the first radiator;

a first feed point is disposed on the third radiator or the first radiator, and the first feed point is configured to feed the antenna structure; and wherein a third slot is at the first position of the side frame.

2. The electronic device according to claim 1, wherein the first feed point is disposed on the third radiator, and the first feed point is disposed at an end that is of the third radiator and that is farthest away from the second radiator.

3. The electronic device according to claim 2, wherein the second radiator and the third radiator are spaced in a third direction, and another virtual straight line that extends in the third direction passes through the third radiator and the second radiator.

4. The electronic device according to claim 2, wherein the antenna structure further comprises a first capacitor, a first end of the first capacitor is electrically connected to the third radiator, and a second end of the first capacitor is electrically connected to the second radiator.

5. The electronic device according to claim 4, wherein the second end of the first capacitor is electrically connected to an end that is of the second radiator and that is located in the first slot.

6. The electronic device according to claim 4, wherein a capacitance value of the first capacitor is less than or equal to 1 pF.

7. The electronic device according to claim 1, wherein the third radiator is a metal sheet.

8. The electronic device according to claim 7, wherein a thickness of the metal sheet is less than a minimum thickness of the side frame.

9. The electronic device according to claim 1, wherein an electrical length of the third radiator is less than a quarter of a first wavelength, and the first wavelength corresponds to an operating frequency band of the antenna structure.

10. The electronic device according to claim 3, wherein the first radiator between the first position and the second position is an ungrounded floating metal.

11. The electronic device according to claim 1, wherein an end that is of the second radiator and that is located in the first slot is electrically connected to the ground, and the second radiator is electrically connected to the ground at the third position.

12. The electronic device according to claim 1, wherein the antenna structure further comprises a tuner; and wherein a first end of the tuner is electrically connected to the end that is of the second radiator and that is located in the first slot, and a second end of the tuner is electrically connected to the ground.

13. An electronic device, comprising:

an antenna structure, comprising a first radiator, a second radiator, and a third radiator;

a ground, wherein the antenna structure is grounded through the ground; and a side frame, wherein a part of the side frame has a first position, a second position, and a third position in sequence, a first portion of the side frame that is between the first position and the second position is configured as the first radiator, and a second portion of the side frame that is between the second position and the third position is configured as the second radiator, wherein:

a first slot is at the second position of the side frame;

a second slot is between the second radiator and the ground;

the first radiator extends in a first direction, and is spaced from the third radiator in a second direction, the second direction is perpendicular to the first direction, and a virtual straight line that extends in the second direction passes through the third radiator and the first radiator;

a first feed point is disposed on the third radiator or the first radiator, and the first feed point is configured to feed the antenna structure; and the first radiator does not comprise any slot at the first position, and the first radiator is electrically connected to the ground at the first position.

14. The electronic device according to claim 13, wherein a length of the first radiator is greater than a length of the second radiator.

15. The electronic device according to claim 14, wherein the antenna structure further comprises a second capacitor, a first end of the second capacitor is electrically connected to the third radiator, and a second end of the second capacitor is electrically connected to the first radiator.

16. The electronic device according to claim 15, wherein the second end of the second capacitor is electrically connected to an end that is of the first radiator and that is located in the first slot.

17. The electronic device according to claim 15, wherein a capacitance value of the second capacitor is less than or equal to 1 pF.

18. An electronic device, comprising:

an antenna structure, comprising a first radiator, a second radiator, and a third radiator;

a ground, wherein the antenna structure is grounded through the ground;

a side frame, wherein a part of the side frame has a first position, a second position, and a third position in sequence, a first portion of the side frame that is between the first position and the second position is configured as the first radiator, and a second portion of the side frame that is between the second position and the third position is configured as the second radiator; and a first capacitor, a first end of the first capacitor is electrically connected to the third radiator, and a second end of the first capacitor is electrically connected to the second radiator, wherein:

a first slot is at the second position of the side frame;

a second slot is between the second radiator and the ground;

the first radiator extends in a first direction, and is spaced from the third radiator in a second direction, the second direction is perpendicular to the first direction, and a virtual straight line that extends in the second direction passes through the third radiator and the first radiator; and a first feed point is disposed on the third radiator or the first radiator, and the first feed point is configured to feed the antenna structure.

19. The electronic device according to claim 18, wherein the first feed point is disposed on the third radiator, and the first feed point is disposed at an end that is of the third radiator and that is farthest away from the second radiator.

20. The electronic device according to claim 18, wherein a capacitance value of the first capacitor is less than or equal to 1 pF.

* * * * *